United States Patent
Yokoyama et al.

(10) Patent No.: US 11,241,760 B2
(45) Date of Patent: Feb. 8, 2022

(54) SOLDER ALLOY, SOLDER PASTE, SOLDER BALL, RESIN FLUX-CORED SOLDER AND SOLDER JOINT

(71) Applicant: SENJU METAL INDUSTRY CO., LTD., Tokyo (JP)

(72) Inventors: Takahiro Yokoyama, Saitama (JP); Takahiro Matsufuji, Tokyo (JP); Hikaru Nomura, Tokyo (JP); Shunsaku Yoshikawa, Tokyo (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 16/642,288

(22) PCT Filed: Feb. 22, 2019

(86) PCT No.: PCT/JP2019/006702
§ 371 (c)(1),
(2) Date: Feb. 26, 2020

(87) PCT Pub. No.: WO2019/171978
PCT Pub. Date: Sep. 12, 2019

(65) Prior Publication Data
US 2020/0376608 A1    Dec. 3, 2020

(30) Foreign Application Priority Data

Mar. 8, 2018  (JP) .............................. JP2018-042041
Oct. 19, 2018 (JP) .............................. JP2018-197327

(51) Int. Cl.
*B23K 35/26* (2006.01)
*B23K 35/02* (2006.01)
*B23K 103/08* (2006.01)

(52) U.S. Cl.
CPC .......... *B23K 35/264* (2013.01); *B23K 35/025* (2013.01); *B23K 35/262* (2013.01); *B23K 2103/08* (2018.08)

(58) Field of Classification Search
CPC .. B23K 35/264; B23K 35/025; B23K 35/262; B23K 2103/08
See application file for complete search history.

(56) References Cited

U.S. PATENT DOCUMENTS

| 6,156,132 A | 12/2000 | Yamashita et al. | |
| 8,388,724 B2 * | 3/2013 | Kato | B22F 1/025 75/255 |

(Continued)

FOREIGN PATENT DOCUMENTS

| CN | 102029479 A | * | 4/2011 |
| CN | 102059473 A | | 5/2011 |

(Continued)

OTHER PUBLICATIONS

JP-2000079494-A NPL translation (Year: 2000).*

(Continued)

*Primary Examiner* — Anthony J Zimmer
*Assistant Examiner* — Ricardo D Morales
(74) *Attorney, Agent, or Firm* — Myers Wolin, LLC

(57) ABSTRACT

The present invention provides a solder alloy, a solder paste, a solder ball, a resin flux-cored solder and a solder joint, both of which has the low-melting point to suppress the occurrence of the fusion failure, improves the ductility and the shear strength, and has excellent heat-cycle resistance. The solder alloy comprises an alloy composition composed of 35 to 68 mass % of Bi, 0.1 to 2.0 mass % of Sb, 0.01 to 0.10 mass % of Ni, and a balance of Sn. The alloy composition may contain at least one of Co, Ti, Al and Mn in total amount of 0.1 mass % or less. The solder alloy may be suitably used (Continued)

for a solder paste, a solder ball, a resin flux-cored solder and a solder joint.

14 Claims, 2 Drawing Sheets

(56) References Cited

U.S. PATENT DOCUMENTS

| | | | |
|---|---|---|---|
| 9,095,936 B2 | 8/2015 | McIsaac et al. | |
| 2013/0175688 A1* | 7/2013 | Lee .................. | B23K 35/262 |
| | | | 257/738 |
| 2015/0037087 A1 | 2/2015 | Tachibana et al. | |
| 2015/0044465 A1* | 2/2015 | Ganbe ............... | B23K 35/0227 |
| | | | 428/378 |
| 2016/0074971 A1 | 3/2016 | Tachibana et al. | |

FOREIGN PATENT DOCUMENTS

| | | | |
|---|---|---|---|
| EP | 2987876 A1 | | 2/2016 |
| JP | 11-221693 A | | 8/1999 |
| JP | 2000079494 A | * | 3/2000 |
| JP | 2000-280090 A | | 10/2000 |
| JP | 2013-540591 A | | 11/2013 |
| JP | 5578301 B1 | | 8/2014 |
| JP | 5679094 B1 | | 3/2015 |
| JP | 2016026884 A | * | 2/2016 |
| JP | 2017-51984 A | | 3/2017 |

OTHER PUBLICATIONS

CN-102029479-A english translation description (Year: 2011).*
CN-102029479-A english translation abstract (Year: 2011).*
JP-2016026884-A english translation description (Year: 2016).*

Office Action issued by the Patent Office of India for corresponding Indian Patent Application No. 202047009420, dated Jun. 10, 2020, with an English translation.
Communication with the extended European search report issued by the European Patent Office for corresponding Patent Application No. 19764526.0, dated Jul. 9, 2020.
Decision to Grant a Patent issued by the Japan Patent Office for corresponding Japanese Patent Application No. 2018-197327, dated Jan. 8, 2019, with an English translation.
Notice of Reasons for Refusal issued by the Japan Patent Office for corresponding Japanese Patent Application No. 2018-197327, dated Nov. 21, 2018, with an English translation.
International Search Report issued by the Japan Patent Office for corresponding International Patent Application No. PCT/JP2019/006702, dated May 14, 2019, with an English translation.
Search Report and Technical Examination Report issued by the Brazilian Patent and Trademark Office at the Ministry of Economy of Federal Public Service for corresponding Brazilian Patent No. BR112020005521-2, dated Nov. 9, 2020, with an English translation.
Office Action issued by the Mexican Institute of Industrial Property for corresponding Mexican Patent Application No. MX/a/2020/006695, dated Jan. 14, 2021, and received Jan. 26, 2021, with an English translation.
Communication pursuant to Article 94(3) EPC issued by the European Patent Office for corresponding European Patent Application No. 19 764 526.0-1103, dated Mar. 18, 2021.
The Second Office Action issued by The State Intellectual Property Office of People's Republic of China for corresponding Chinese Patent Application No. 201980004823.2, dated Mar. 30, 2021, with an English machine translation.
Office Action issued by the Mexican Institute of Industrial Property for corresponding Mexican Patent Application No. MX/a/2020/006695, dated Jul. 14, 2021, with an English machine translation.

* cited by examiner

SOLDER ALLOY, SOLDER PASTE, SOLDER BALL, RESIN FLUX-CORED SOLDER AND SOLDER JOINT

CROSS-REFERENCE TO RELATED APPLICATION

This application is a National Phase of PCT/JP2019/006702, filed Feb. 22, 2019, which claims priority to Japanese Patent Application No. 2018-197327, filed on Oct. 19, 2018, and Japanese Patent Application No. 2018-042041, filed on Mar. 8, 2018. The contents of each are wholly incorporated herein by reference.

FIELD

The present invention relates to a solder alloy having a low-melting point, a solder paste, a solder ball, a resin flux-cored solder and a solder joint.

BACKGROUND

In recent years, miniaturization of an electric device such as a CPU (Central Processing Unit) has been demanded. Since thermal loading at soldering increases as the electric device becomes smaller, it is desirable to carry out the soldering at a low temperature. If the soldering is carried out at the low temperature, it is possible to manufacture a highly reliable circuit board. In order to carry out the soldering at the low temperature, it is necessary to use a solder alloy having a low-melting point.

The low-melting point solder alloy includes Sn—58Bi and Sn—52In, as disclosed in JIS Z 3282 (2017). The melting points of these alloys are 139° C. and 119° C., respectively and each of which has an alloy composition representing the low-melting point solder. In particular, Sn—58Bi is widely used as the solder alloy which is low-cost and has excellent wettability.

However, since Bi phase is hard and brittle, it deteriorates mechanical properties of the solder alloy. For this reason, a solder joint where a Sn—Bi solder alloy is used may be broken when a substrate is distorted due to heating temperature at bonding.
Therefore, various solder alloys have been studied in order to improve reliability of the solder joint while suppressing an increase in the melting point.

For example, Patent Literature 1 discloses the solder alloy with which an electroless Ni-plated electrode is connected exhibits excellent connection reliability. The solder alloy disclosed in the literature is a Sn—Bi—Cu—Ni solder alloy in which Cu is added to the Sn—Bi solder, to which Ni, which forms an all proportional solid solution with Cu, is further added. In this literature, it is disclosed that since Cu and Ni form the all proportional solid solution, solubility of Cu and Ni is lowered in the solder alloy in which Cu and Ni are contained in advance, and diffusion of Cu and Ni from the electrode to the solder alloy is suppressed thereby growth of a brittle P-rich layer is suppressed.

Patent Literature 2 also discloses the solder alloy with which the electroless Ni-plated electrode is connected exhibits the connection reliability. Likewise Patent Literature 1, it is disclosed in this literature that, by containing Cu, the diffusion of Ni from the electrode to the solder alloy is suppressed and the growth of the brittle P-rich layer is suppressed.

CITATION LIST

Patent Literature

[PTL 1] JP5578301B
[PTL 2] JP5679094B

SUMMARY

Technical Problem

As described above, the inventions disclosed in Patent Literature 1 and 2 are the excellent inventions capable of suppressing the growth of the P-rich layer at a bonding interface between the solder alloy and the electroless Ni-plated electrode and also exhibiting the excellent connection reliability by containing Cu. However, in the inventions disclosed in both documents, Cu is indispensable to bond with the electroless Ni plating electrode, whereas in a case of using a paste, it is not necessary to apply an electroless Ni plating to an electrode and Cu is not always necessary.

Patent Literature 1 discloses that when content of Cu is within a predetermined range, excessive formation of a brittle Sn—Cu compound generated in the solder alloy can be suppressed. However, even if the excessive formation of the Sn—Cu compound is suppressed, which does not mean that the Sn—Cu compound is not formed at all. In this literature, it is disclosed that the Sn—Cu compound is excessively formed and the ductility of the solder alloy is lowered due to an excessive addition of Cu. However, presence of the Sn—Cu compound may cause a decrease in the ductility of the solder alloy. As a result, shear strength may decrease. In order to cope with the miniaturization of the electric device in recent years, various studies are required such that the ductility is improved further.

In Patent Literature 2, it is disclosed that Sb is contained in order to improve the ductility. However, in the solder alloy disclosed in the literature, since Cu is contained in a predetermined amount in the Sn—Bi based solder alloy, the melting point rises particularly in a Sn-58Bi based solder alloy. When the melting point rises, a coarse Sn—Cu compound is precipitated due to time to solidification, and therefore further improvements are needed to obtain higher ductility. In addition, if the melting point is raised by containing Cu, the solder alloy is not melted by a conventional reflow temperature and a fusion failure may occur. If the reflow temperature is increased in order to melt the solder alloy having a high-melting point, a warpage occurs in substrates or packages during heating, and the solder alloy and the electrode are separated from each other. In this instance, since the solidification of the solder alloy is faster than relaxation of the warpage in the substrates or the packages during cooling, the solder alloy solidifies while the solder alloy and electrode are separated from each other, and the fusion failure may occur.

Focusing on an aspect of reliability, in a thermal cycling test, since stress is concentrated on a solder joint due to a difference in a thermal expansion coefficient between the substrate and the electric device, there is room for further improving the ductility of the solder alloy to improve the reliability of the solder joint.

As described above, in the conventional solder alloy, it is difficult to achieve at the same time the suppression of the fusion failure due to the low-melting point, the ductility and the shear strength of the solder alloy, and heat-cycle resistance. In order to suppress deterioration in the reliability of electronic circuits due to the miniaturization of the electric device, it is required to achieve these characteristics at the same time.

It is an object of the present invention to provide a solder alloy, a solder paste, a solder ball, a resin flux-cored solder and a solder joint, both of which has the low-melting point to suppress the occurrence of the fusion failure, improves the ductility and the shear strength, and has excellent heat-cycle resistance.

Solution to Problem

The inventors focused on making an alloy organization of the solder alloy fine in order to improve the ductility of the Sn—Bi solder alloy having the low melting point. In this process, an alternative element to Cu was examined to suppress the formation of the Sn—Cu compound and the fusion failure in the Sn—Bi—Cu—Ni solder alloy disclosed in Patent Literature 1 which has excellent in the connection reliability among the Sn—Bi based solder alloys.

Here, in order to make the alloy organization fine, it is necessary to suppress coarsening of crystal phase precipitated from a start of the solidification of a molten solder, which may be solved by forming pinning phase for suppressing the coarsening around the crystal phase precipitated from the start of the solidification. Therefore, it is necessary to select an element such that a fine compound is precipitated before the solidification is completed in cooling process.

As a result of further examinations from such the aspect, besides Cu, by adding a predetermined amount of Sb, which is dissolved in β-Sn during melting and forms a fine compound with Sn during cooling, it was fortuitously confirmed that the alloy organization became finer and also the ductility was improved significantly in a tensile test in which strain was applied at a strain rate considering expansion and contraction of the solder alloy by the heat cycling. And it was found that the miniaturization of such the alloy organization is not only caused by Sb, but is synergistically expressed by simultaneously containing Ni which has conventionally improved the wettability with the electrode as described above. In addition to this, it was found that the alloy composition in which both Sb and Ni are simultaneously contained in predetermined amounts suppresses the growth of an intermetallic compound layer formed at an interface with the electrode.

The present inventions obtained by these findings are as follows.

(1) A solder alloy characterized in that comprising an alloy composition consisting of 35 to 68 mass % of Bi, 0.1 to 2.0 mass % of Sb, 0.01 to 0.10 mass % of Ni, and a balance of Sn.

(2) The solder alloy according to (1), wherein the alloy composition further contains at least one of Co, Ti, Al and Mn in total amount of 0.1 mass % or less.

(3) The solder alloy according to (1) or (2), wherein the alloy composition further contains at least one of P, Ge, and Ga in total amount of 0.1 mass % or less.

(4) The solder alloy according to any one of (1) to (3), wherein the alloy composition satisfies the following relationship (1).

$$0.0200 \leq Ni/Sb \leq 0.2000 \tag{1}$$

In the relationship (1), Ni and Sb represent each content in the solder alloy (mass %).

(5) A solder paste comprising the solder alloy according to any one of (1) to (4).

(6) A solder ball comprising the solder alloy according to any one of (1) to (4).

(7) A resin flux-cored solder comprising the solder alloy according to any one of (1) to (4).

(8) A solder joint comprising the solder alloy according to any one of (1) to (4).

BRIEF DESCRIPTION OF DRAWINGS

FIG. 1 is SEM photographs of solder alloys.

DESCRIPTION of EMBODIMENTS

Figure 1A:
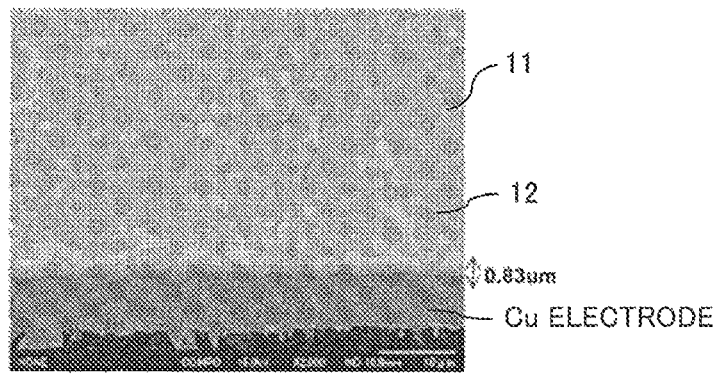
FIG. 1(a) is a fracture surface SEM photography of the solder alloy of Example 2.

The present invention is described in more detail below. In this description, "%" with respect to a solder alloy composition is "mass %" unless otherwise specified.

1. Alloy Composition of Solder Alloy (1) Bi: 35 to 68%

Bi is an element required to suppress generation of the fusion failure by lowering the melting point of the solder alloy and to exhibit excellent heat-cycle resistance. Since the melting point of a Sn—Bi eutectic alloy is as low as 139° C., Bi is able to lower the melting point of the solder alloy and suppress the fusion failure. In addition, it is known that the solder alloy containing a predetermined amount of Bi exhibits superplasticity, and exhibits excellent ductility. Therefore, the solder alloy containing the predetermined amount of Bi is excellent in the ductility and the heat-cycle resistance.

If the content of Bi is less than 35%, the fusion failure may occur due to an increase in the melting point and the heat-cycle resistance may deteriorate. The lower limit of the content of Bi is 35% or more, preferably 45% or more, more preferably 50% or more, and still more preferably 54% or more. On the other hand, if the content of Bi exceeds 68%, the fusion failure may occur due to the increase in the melting point. Further, due to a precipitation of a large amount of hard, brittle and coarse Bi phase, the solder alloy itself becomes hard and the ductility deteriorates. An upper limit of the content of Bi is 68% or less, preferably 65% or less, more preferably 63% or less, and still more preferably 58% or less.

(2) Sb: 0.1 to 2.0%

Sb is an element required for making the alloy organization fine. Sb dissolves to in β-Sn about 10% at about 200° C., whereas a solid solution limit of Sb decreases as the temperature decreases, and also little Sb dissolves and β-SnSb is precipitated at room temperature. The β-SnSb precipitates around Sn phase or Bi phase and exerts a pinning effect during the solidification, thereby the coarsening of each phase is suppressed.

If the content of Sb is less than 0.1%, no effect mentioned is exhibited. The lower limit of the content of Sb is 0.1% or more, preferably 0.2% or more, more preferably 0.3% or more, still more preferably 0.4% or more, and particularly preferably 0.5% or more. On the other hand, if the content of Sb exceeds 2.0%, β-SnSb is excessively precipitated and the melting point rises. In addition, since a coarse β-SnSb is formed, the ductility is lowered. The upper limit of the content of Sb is 2.0% or less, preferably 1.5% or less, more preferably 1.0% or less, still more preferably 0.8% or less, particularly preferably 0.7% or less, and most preferably 0.6% or less.

(3) Ni: 0.01 to 0.10%

Ni is able to improve the ductility of the solder alloy and the shear strength of the solder joint. If Ni is further added to the alloy composition containing Sb, the alloy organization becomes finer than the alloy composition to which Sb is added alone, and it is possible to suppress the growth of the intermetallic compound layer formed at the interface with the electrode.

If the content of Ni is less than 0.01%, no effect mentioned above is exhibited. The lower limit of the content of Ni is 0.01% or more, more preferably 0.015% or more, and still more preferably 0.02% or more. On the other hand, if the content of Ni exceeds 0.10%, the shear strength decreases. The upper limit of the content of Ni is 0.10% or less, preferably 0.08% or less, more preferably 0.06% or less, still more preferably 0.055% or less, particularly preferably 0.05% or less, and most preferably 0.03% or less.

(4) 0.1% or less of at least one of Co, Ti, Al and/or Mn in total

These elements are optional elements which may be contained as long as they do not hinder the effects mentioned above. From a viewpoint of maintaining the mechanical properties and the heat-cycle resistance while suppressing the formation of compounds and also keeping the miniaturization of the alloy organization, the content of these elements is preferably 0.1% or less.

(5) 0.1 mass % or less of at least one of P, Ge and Ga

These elements are optional elements capable of suppressing oxidation of Sn and improving the wettability. If the content of these elements does not exceed 0.1%, the fluidity of the solder alloy on a solder surface is not impaired. The total of the content of these elements is more preferably 0.003 to 0.1%. Although the content of each element is not particularly limited, the content of P is preferably 0.003 to 0.05% in order to sufficiently express the effects mentioned above. The content of Ge is preferably 0.005 to 0.01% and more preferably 0.005 to 0.01%. The content of Ga is preferably 0.005 to 0.1% and more preferably 0.005 to 0.01%.

(6)

$$0.0200 \leq Ni/Sb \leq 0.2000 \quad (1)$$

The solder alloy according to the present invention preferably contains Sb and Ni at the same time in predetermined amounts in order to promote the miniaturization of the alloy organization. Here, as mentioned above, Sb makes β-SnSb precipitate at room temperature, and precipitates around the Sn phase or the Bi phase during the solidification of the β-SnSn to exert the pinning effect, by which Sb can suppress the coarsening of each phase. That is, Sb mainly contributes to the miniaturization of the alloy organization in the solder alloy. If Ni is contained in the predetermined amount at the same time Sb of which the content is within the range mentioned above, the fine effect of Sb is synergistically improved. In addition, the growth of the intermetallic compound layer formed at the interface with the electrode can be suppressed. Therefore, when Ni and Sb coexist having these contents being within the ranges mentioned above, the miniaturization of the alloy composition and the suppression of the growth of the intermetallic compound layer at a bonding interface can be realized simultaneously.

Here, Sb contributes to the alloy organization of the solder alloy per se, while Ni further contributes for suppressing the growth of the intermetallic compound layer. Therefore, when the contents of both elements are appropriately balanced, the ductility, the shear strength, and the heat-cycle resistance, which are the effects of present invention, are further improved. Specifically, it is inferred as follows. Sb causes the precipitation of fine SnSb, and Ni causes the precipitation of $Ni_3Sn_2$ and $Ni_3Sn_4$. Therefore, when precipitation amounts of SnSb, $Ni_3Sn_2$ and $Ni_3Sn_4$ are within appropriate ranges, both actions including the miniaturization of the alloy organization and the inhibition of the growth of the intermetallic compound layer at the bonding interface are exhibited such that the effects of the present invention are further improved.

In order to exhibit such the actions and effects sufficiently, the lower limit of the relationship (1) is preferably 0.0200% or more, more preferably 0.0250 or more, and still more preferably 0.0300 or more. The upper limit of the relationship (1) is, in a preferable order, 0.2000 or less, 0.1500 or less, 0.1375 or less, 0.1100 or less, 0.1000 or less, 0.0800 or less, 0.0750 or less, 0.0600 or less, 0.0500 or less, 0.0429 or less, 0.0400 or less, and 0.0375 or less.

(7) Balance: Sn

A balance of the solder alloy according to the present invention is Sn. In addition to the elements mentioned above, an unavoidable impurity may be contained. Even when the unavoidable impurity is contained, the effects mentioned above are not affected. As will be described later, even if an element which is not contained in the present invention is contained as the unavoidable impurity, the effects mentioned above are not affected.

(8) Zr, Al and Ag, Fe, Ca, Pt, Mg and Cu

It is desirable that the solder alloy according to the present invention does not contain these elements. Simultaneous addition of Al and Ag, or Zr forms coarse compounds which prevent the formation of a uniform and fine alloy organization. Fe, Ca, Pt or Mg promotes the coarsening of the alloy organization. Cu markedly increases the melting point of the solder alloy. Note that when these elements are contained as the unavoidable impurities, the effects mentioned above are not affected.

2. Solder Paste

The solder alloy according to the present invention may be used as a solder paste. The solder paste is a pasty mixture of solder alloy powder and a small amount of fluxes. The solder alloy according to the present invention may be used as a solder paste for mounting an electronic component on a printed circuit board by a reflow soldering method. The flux used in the solder paste may be either a water-soluble flux or a non-water-soluble flux. Typically, a rosin-based flux is used which is a rosin-based, water insoluble flux.

The solder paste according to the present invention may be applied to an electrode on a board side to be used for bonding to a Sn—Ag—Cu solder ball on a BGA side.

3. Solder Ball

The solder alloy according to the present invention may be used as a solder ball. The solder ball according to the present invention is used for forming a bump on an electrode of a semiconductor package such as BGA (Ball Grid Arrays), or substrates. The diameter of the solder ball according to the present invention is preferably 1 to 1000 μm. The solder ball can be manufactured by a common solder ball manufacturing method.

4. Resin Flux-Cored Solder

The solder alloy according to the present invention is suitably used in a resin flux-cored solder where flux is previously contained in the solder. It may also be used in a form of wire solder from the viewpoint of supplying the solder to a soldering iron. Furthermore, it may be applied to an incoming wire solder in which the flux is sealed to the wire solder. The surface of each solder may be coated with the flux. In addition, the flux may be coated on the surface of the solder in which the flux is not contained.

The content of the flux in the solder is, for example, 1 to 10 mass %, and the content of the rosin in the flux is 70 to 95%. Generally, the rosin is an organic compound and contains carbon and oxygen, and therefore, the rosin used in the present invention is not limited by a terminal functional group or the like.

5. Solder Joint

A solder joint according to the present invention connects an IC chip and a substrate (an interposer) in a semiconductor package, or connects the semiconductor package and a printed circuit board. That is, the solder joint according to the present invention is referred to as a connecting portion of the electrode, and is able to form by using a common soldering condition.

6. Other

In addition to the above, the solder alloy according to the present invention may be used as a preform solder, a solder wire and the like.

A manufacturing method of the solder alloy according to the present invention may be carried out in accordance with a conventional method.

A bonding method using the solder alloy according to the present invention may be carried out in accordance with a conventional method by using a reflow method, for example. When the flow soldering is carried out, the melting point of the solder alloy may be approximately 20° C. higher than a liquidus temperature. Further, when bonding is carried out by the solder alloy according to the present invention, the alloy organization may be finer by considering cooling speed during solidification. For example, the solder joint is cooled at the cooling speed of 2 to 3° C./s or more. The other bonding conditions may be appropriately adjusted in accordance with the alloy composition of the solder alloy.

The solder alloy according to the present invention can produce a low α-ray alloy by using a low α-ray material as its raw material. Such the low α-ray alloy can suppress soft errors when used to form solder bumps around memories.

EXAMPLES

Solder alloys were prepared, each of which consists of alloy composition shown in Table 1, to observe the alloy organization and measure the melting point (liquidus temperature), and to evaluate the ductility, the shear strength and the heat-cycle resistance.

Observing Alloy Organization

Each solder alloy consisting of each alloy composition shown in Table 1 was cast into a predetermined mold, and the obtained solder alloy was molded with a resin and polished, and a portion where the solder alloy was polished by about half was photographed with a FE-SEM at 1000-fold magnification.

Liquidus Temperature

Each solder alloy shown in Table 1 was prepared and the liquidus temperature of the solder alloys were measured. The liquidus temperature was measured by a DSC-based method similar to the DSC-based method for measuring the solidus temperature shown in JIS Z 3198-1. When the liquidus temperature was 170° C. or less, it was evaluated as "T", and when it exceeded 170° C., it was evaluated as "F".

Ductility

The ductility was measured according to JISZ3198-2. For each solder alloy listed in Table 1, a test piece having a gauge length of 30 mm and a diameter of 8 mm was produced by casting into a mold. The produced test piece was pulled at a stroke of 0.6 mm/min at room temperature by a Type 5966 manufactured by Instron Corporation, and elongation (the ductility) was measured when the test piece was broken. In the present example, when the ductility was 80% or more, it was judged to locate a level capable of coping with the miniaturization of the electric device in the future and evaluated as "T". When the ductility was less than 80%, it was evaluated as "F".

Shear Strength

Each solder alloy listed in Table 1 was atomized to be a solder powder. A solder paste of the respective solder alloy was prepared by mixing with a soldering flux made of a pine resin, a solvent, an activator, a thixotropic agent, an organic acid or the like. The solder paste was printed on a Cu-electrode in a printed circuit board (material: FR-4) having a thickness of 0.8 mm with a metal mask having a thickness of 120 μm, and a BGA component was mounted with a mounter, and reflow soldering was performed at a maximum temperature of 190° C. and a holding time of 60 seconds to produce a test substrate.

The shear strength (N) of the test substrate was measured by a shear strength measuring device (STR-1000 manufactured by RHESCA Corporation) under a condition of 6 mm/min. When the shear strength was 60.00N or more, it was judged to locate a level capable of being used practically without any problem, and it was evaluated as "T". When the shear strength was less than 60.00N, it was evaluated as "F".

Heat-Cycle Resistance

Each solder alloy listed in Table 1 was atomized to be a solder powder. A solder paste of the respective solder alloy was prepared by mixing with a soldering flux made of the pine resin, the solvent, the activator, the thixotropic agent, the organic acid or the like. The solder paste was printed on the Cu electrode, which was subjected to an OPS treatment, in the printed circuit board (material: FR-4) having the thickness of 0.8 mm with the metal mask having the thickness of 100 μm, and 15 BGA components were mounted with the mounter, and reflow soldering was performed at the maximum temperature of 190° C. and the holding time of 60 seconds to produce the test substrate.

The test substrates soldering with the respective solder alloy were placed in a heat-cycle test device set to a condition of low temperature −40° C., high temperature +125° C., and the holding time of 10 minutes, and number of cycles at which the resistance value of at least one BGA component exceeded 15Ω was determined from an initial resistance value of 3 to 5Ω. When the cycles were 1700 or more, it was evaluated as "T" and when the cycles were less than 1700, it was evaluated as "F".

The evaluation results are shown in Table 1.

TABLE 1

| | | ALLOY COMPOSTION (mass %) | | | | | | | | | | | |
|---|---|---|---|---|---|---|---|---|---|---|---|---|---|
| | | Sn | Bi | Sb | Ni | Co | Ti | Al | Mn | P | Ge | Ga | Cu |
| EXAMPLES | 1 | BAL | 35 | 0.5 | 0.015 | — | — | — | — | — | — | — | — |
| | 2 | BAL | 58 | 0.5 | 0.015 | — | — | — | — | — | — | — | — |
| | 3 | BAL | 65 | 0.5 | 0.015 | — | — | — | — | — | — | — | — |

TABLE 1-continued

| | | | | | | | | | | | | |
|---|---|---|---|---|---|---|---|---|---|---|---|---|
| | 4 | BAL | 58 | 0.1 | 0.015 | — | — | — | — | — | — | — |
| | 5 | BAL | 58 | 1.0 | 0.015 | — | — | — | — | — | — | — |
| | 6 | BAL | 58 | 2.0 | 0.015 | — | — | — | — | — | — | — |
| | 7 | BAL | 58 | 0.5 | 0.01 | — | — | — | — | — | — | — |
| | 8 | BAL | 58 | 0.5 | 0.06 | — | — | — | — | — | — | — |
| | 9 | BAL | 58 | 0.5 | 0.10 | — | — | — | — | — | — | — |
| | 10 | BAL | 58 | 0.5 | 0.055 | 0.1 | — | — | — | — | — | — |
| | 11 | BAL | 58 | 0.4 | 0.03 | — | 0.1 | — | — | — | — | — |
| | 12 | BAL | 58 | 0.5 | 0.02 | — | — | 0.1 | — | — | — | — |
| | 13 | BAL | 58 | 0.4 | 0.02 | — | — | — | 0.1 | — | — | — |
| | 14 | BAL | 58 | 0.5 | 0.03 | — | — | — | — | 0.003 | — | — |
| | 15 | BAL | 58 | 0.7 | 0.03 | — | — | — | — | 0.05 | — | — |
| | 16 | BAL | 58 | 0.8 | 0.03 | — | — | — | — | — | 0.1 | — |
| | 17 | BAL | 58 | 0.4 | 0.055 | — | — | — | — | — | 0.01 | — |
| | 18 | BAL | 58 | 0.5 | 0.03 | — | — | — | — | — | 0.005 | — |
| | 19 | BAL | 58 | 0.6 | 0.03 | — | — | — | — | — | — | 0.1 |
| | 20 | BAL | 58 | 0.5 | 0.03 | — | — | — | — | — | — | 0.005 |
| | 21 | BAL | 58 | 0.5 | 0.03 | — | — | — | — | — | — | 0.01 |
| COMPAR- | 1 | BAL | 58 | — | — | — | — | — | — | — | — | 13 |
| ATIVE | 2 | BAL | 58 | 0.5 | — | — | — | — | — | — | — | — |
| EXAM- | 3 | BAL | 58 | 0.5 | — | — | — | — | — | — | — | 0.5 |
| PLES | 4 | BAL | 58 | — | 0.015 | — | — | — | — | — | — | — |
| | 5 | BAL | 58 | — | 0.03 | — | — | — | — | — | — | 0.5 |
| | 6 | BAL | 30 | 0.5 | 0.015 | — | — | — | — | — | — | — |
| | 7 | BAL | 75 | 0.5 | 0.015 | — | — | — | — | — | — | — |
| | 8 | BAL | 58 | 0.05 | 0.015 | — | — | — | — | — | — | — |
| | 9 | BAL | 58 | 3.0 | 0.015 | — | — | — | — | — | — | — |
| | 10 | BAL | 58 | 0.5 | 0.005 | — | — | — | — | — | — | — |
| | 11 | BAL | 58 | 0.5 | 0.20 | — | — | — | — | — | — | — |
| | 12 | BAL | 58 | 0.5 | 0.015 | — | — | — | — | — | — | 0.1 |
| | 13 | BAL | 58 | 0.5 | 0.015 | — | — | — | — | — | — | — |
| | 14 | BAL | 58 | 0.5 | 0.015 | — | — | — | — | — | — | — |
| | 15 | BAL | 58 | 0.5 | 0.015 | — | — | — | — | — | — | — |
| | 16 | BAL | 58 | 0.5 | 0.015 | — | — | — | — | — | — | — |
| | 17 | BAL | 58 | 0.5 | 0.015 | — | — | — | — | — | — | — |
| | 18 | BAL | 58 | 0.5 | 0.015 | — | — | — | — | — | — | — |

| | | ALLOY COMPOSTION (mass %) | | | | | RELATION- SHIP (1) | LIQUIDUS TEMPERATURE | DUCTILITY | SHEAR STRENGTH | HEAT CYCLE RESISTANCE |
|---|---|---|---|---|---|---|---|---|---|---|---|
| | | Al + Zr | Ag | Fe | Ca | Pt | Mg | | | | |
| EXAM- | 1 | — | — | — | — | — | — | 0.0300 | T | T | T | T |
| PLES | 2 | — | — | — | — | — | — | 0.0300 | T | T | T | T |
| | 3 | — | — | — | — | — | — | 0.0300 | T | T | T | T |
| | 4 | — | — | — | — | — | — | 0.1500 | T | T | T | T |
| | 5 | — | — | — | — | — | — | 0.0150 | T | T | T | T |
| | 6 | — | — | — | — | — | — | 0.0075 | T | T | T | T |
| | 7 | — | — | — | — | — | — | 0.0200 | T | T | T | T |
| | 8 | — | — | — | — | — | — | 0.1200 | T | T | T | T |
| | 9 | — | — | — | — | — | — | 0.2000 | T | T | T | T |
| | 10 | — | — | — | — | — | — | 0.1100 | T | T | T | T |
| | 11 | — | — | — | — | — | — | 0.0750 | T | T | T | T |
| | 12 | — | — | — | — | — | — | 0.0400 | T | T | T | T |
| | 13 | — | — | — | — | — | — | 0.0500 | T | T | T | T |
| | 14 | — | — | — | — | — | — | 0.0600 | T | T | T | T |
| | 15 | — | — | — | — | — | — | 0.0429 | T | T | T | T |
| | 16 | — | — | — | — | — | — | 0.0375 | T | T | T | T |
| | 17 | — | — | — | — | — | — | 0.1375 | T | T | T | T |
| | 18 | — | — | — | — | — | — | 0.0600 | T | T | T | T |
| | 19 | — | — | — | — | — | — | 0.0500 | T | T | T | T |
| | 20 | — | — | — | — | — | — | 0.0400 | T | T | T | T |
| | 21 | — | — | — | — | — | — | 0.0600 | T | T | T | T |
| COMPAR- | 1 | — | — | — | — | — | — | — | T | F | F | F |
| ATIVE | 2 | — | — | — | — | — | — | 0.0000 | T | T | F | T |
| EXAM- | 3 | | | | | | | 0.0000 | F | T | T | T |
| PLES | 4 | — | — | — | — | — | — | — | T | F | F | F |
| | 5 | — | — | — | — | — | — | — | F | F | F | F |
| | 6 | — | — | — | — | — | — | 0.0300 | F | T | F | — |
| | 7 | — | — | — | — | — | — | 0.0300 | F | F | F | — |
| | 8 | — | — | — | — | — | — | 0.3000 | T | T | F | — |
| | 9 | — | — | — | — | — | — | 0.0050 | F | F | F | — |
| | 10 | — | — | — | — | — | — | 0.0100 | T | F | F | — |
| | 11 | — | — | — | — | — | — | 0.4000 | T | F | F | — |
| | 12 | — | — | — | — | — | — | 0.0300 | F | T | F | — |
| | 13 | 0.1 | — | — | — | — | — | 0.0300 | T | T | F | — |

TABLE 1-continued

| | | | | | | | | | | | |
|---|---|---|---|---|---|---|---|---|---|---|---|
| 14 | — | 0.1 | — | — | — | — | 0.0300 | T | T | F | — |
| 15 | — | — | 0.1 | — | — | — | 0.0300 | T | T | F | — |
| 16 | — | — | — | 0.1 | — | — | 0.0300 | T | T | F | — |
| 17 | — | — | — | — | 0.1 | — | 0.0300 | T | T | F | — |
| 18 | — | — | — | — | — | 0.1 | 0.0300 | T | T | F | — |

UNDERLINE MEANS THAT VALUE IS OUTSIDE OF PRESENT INVENTION

As shown in Table 1, Examples 1 to 21 were found to be superior in the ductility and the shear strength. Further, it was found that the generation of the fusion failure was suppressed because the liquidus temperature was low, and the coarsening of the alloy organization was suppressed even after the heat cycling because the alloy organization was fine, and thus the heat-cycle resistance was excellent.

On the other hand, since Comparative Example 1 did not contain Sb or Ni, the alloy organization was not fine, and the ductility, the shear strength, and the heat-cycle resistance were all inferior. The alloy organization of Comparative Example 2 was finer to some extent because it contained Sb, and the ductility and heat-cycle resistance were improved as compared with Comparative Example 1. However, the shear strength was inferior because it did not contain Ni. Since Comparative Example 3 did not contain Ni but contained Cu, the liquidus temperature increased, and the shear strength was inferior.

Since Comparative Example 4 or 5 did not contain Sb, the alloy organization did not become fine and was inferior in the ductility, the shear strength and the heat-cycle resistance.

In Comparative Example 6, since the content of Bi was small, the liquidus temperature increased and the fusion failure occurred. In Comparative Example 7, since the content of Bi was large, the liquidus temperature increased and the fusion failure occurred. Therefore, the heat-cycle resistance was not evaluated in Comparative Example 6 or 7.

In Comparative Example 8, since the content of Sb was small, the alloy organization was not sufficiently fine, and the ductility was inferior. Therefore, the heat-cycle resistance was not evaluated. In Comparative Example 9, since the content of Sb was large, the liquidus temperature increased. Therefore, the heat-cycle resistance was not evaluated.

In Comparative Example 10, since the content of Ni was small, the ductility and the shear strength were inferior. Therefore, the heat-cycle resistance was not evaluated. In Comparative Example 11, since the content of Ni was large, the shear strength were inferior. Therefore, the heat-cycle resistance was not evaluated. In Comparative Examples 12 to 18, since the alloy organization were coarse, the ductility and the like were inferior. Therefore, the heat-cycle resistance were not evaluated.

Figure 1B:
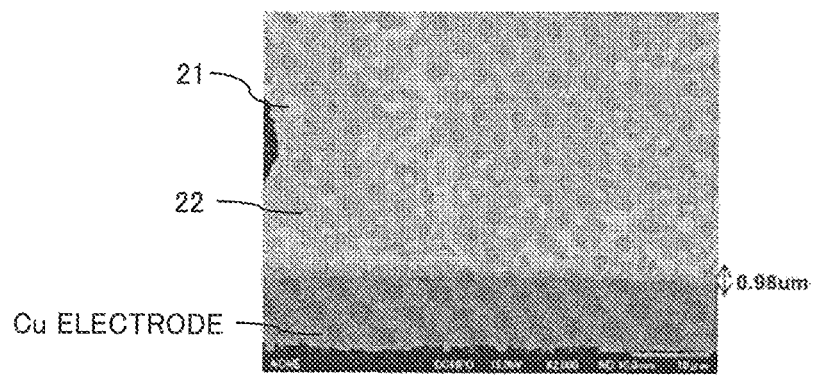
FIG. 1(b) is the fracture surface SEM photography of the solder alloy of Comparative Example 1.
Figure 1C:
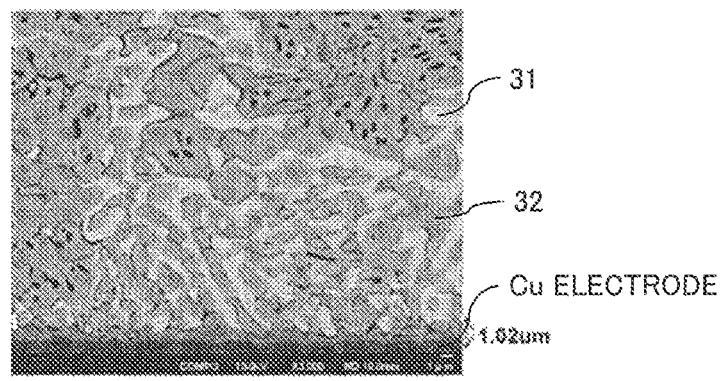
FIG. 1(c) is the fracture surface SEM photography of the solder alloy of Comparative Example 3.
Figure 1D:
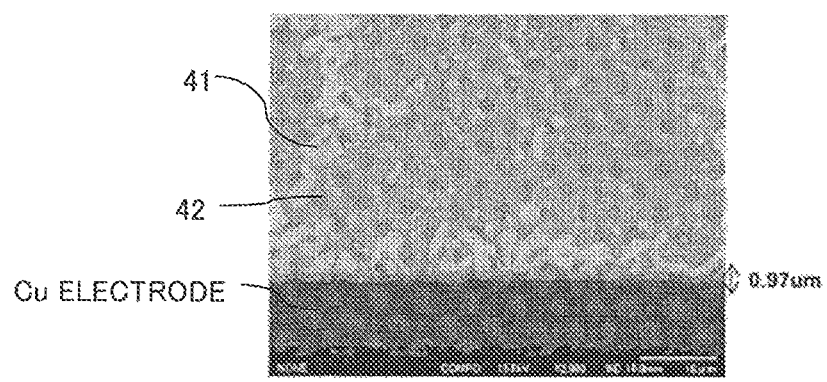
FIG. 1(d) is the cross-section SEM photography of the solder alloy of Comparative Example 5.

Observations of the alloy organization of Example 2 and Comparative Examples 1, 3 and 5 shown in Table 1 are shown. FIG. 1 is SEM photographs of solder alloys: FIG. 1(a) is a fracture surface SEM photography of the solder alloy of Example 2; FIG. 1(b) is the fracture surface SEM photography of the solder alloy of Comparative Example 1; FIG. 1(c) is the fracture surface SEM photography of the solder alloy of Comparative Example 3; and FIG. 1(d) is the cross-section SEM photography of the solder alloy of Comparative Example 5. In FIGS. 1(a) to 1(d), light gray portions correspond to the Bi phase and dark gray portions correspond to the β-Sn phase. The numerical values in the drawings indicate film thickness of the intermetallic compound layer formed at the interface between the Cu-electrode and the solder alloy.

It was found from FIG. 1(a) showing Example 2 that the alloy organization was fine because it contained Sb and Ni in the predetermined amounts. It was also found that the film thickness of the intermetallic compound layer formed at the interface with the electrode was the thinnest. The alloy organization shown in FIG. 1(a) was observed similarly in other Examples. On the other hand, it was found from FIG. 1(b) showing Comparative Example 1 that the coarse Bi phase existed since it did not contain Sb or Ni. It was also found that the film thickness of the intermetallic compound layer became the thickest. It was found from FIG. 1(c) showing Comparative Example 3 that since Sb was contained Sb while Ni was not contained, the alloy organization was coarser and the intermetallic compound layer was thicker than FIG. 1(a). It was found from FIG. 1(d) showing Comparative Example 5 that since Ni was contained whereas Sb was not contained, the alloy organization was coarser and the intermetallic compound layer was thicker than that FIG. 1(a).

As mentioned above, since the Sn—Bi—Sb—Ni solder alloy according to the present invention has fine organization and also is able to suppress the growth of the intermetallic compound layer at the bonding interface, it exhibits excellent ductility, shear strength and heat-cycle resistance.

REFERENCE SIGNS LIST 11, 21, 31, 41 Bi phase
12, 22, 32, 42 Sn phase

The invention claimed is:

1. A solder alloy comprising an alloy composition consisting of 35 to 68 mass % of Bi, 0.1 to 2.0 mass % of Sb, 0.01 to 0.10 mass % of Ni, and a balance of Sn,
wherein the alloy composition satisfies the following relationship (1), $$0.0250 \leq Ni/Sb \leq 0.0429 \text{ or } 0.0600 \leq Ni/Sb \leq 0.0714 \tag{1}$$

wherein, in the relationship (1), Ni and Sb represent each content in the solder alloy (mass %), and
wherein the solder alloy does not contain Cu.

2. The solder alloy according to claim 1, wherein the alloy composition further contains at least one of Co, Ti, Al and Mn in total amount of 0.1 mass % or less.

3. The solder alloy according to claim 1, wherein the alloy composition further contains at least one of P, Ge, and Ga in total amount of 0.1 mass % or less.

4. A solder paste comprising a solder alloy comprising an alloy composition comprising 35 to 68 mass % of Bi, 0.3 to 1.0 mass % of Sb, 0.01 to 0.05 mass % of Ni, and a balance of Sn,
wherein the alloy composition satisfies the following relationship (1), $$0.0250 \leq Ni/Sb \leq 0.0429 \text{ or } 0.0600 \leq Ni/Sb \leq 0.0714 \tag{1}$$

wherein, in the relationship (1), Ni and Sb represent each content in the solder alloy (mass %), and wherein the solder alloy does not contain Cu.

5. A solder ball comprising a solder alloy comprising an alloy composition comprising 35 to 68 mass % of Bi, 0.3 to 1.0 mass % of Sb, 0.01 to 0.05 mass % of Ni, and a balance of Sn, wherein the alloy composition satisfies the following relationship (1), $$0.0250 \leq Ni/Sb \leq 0.0429 \text{ or } 0.0600 \leq Ni/Sb \leq 0.0714 \quad (1)$$

wherein, in the relationship (1), Ni and Sb represent each content in the solder alloy (mass %), and wherein the solder alloy does not contain Cu.

6. A resin flux-cored solder comprising the solder alloy according to claim 1.

7. A solder joint comprising the solder alloy according to claim 1.

8. The solder alloy according to claim 1, wherein the alloy composition satisfies the following relationship (1), $$0.0250 \leq Ni/Sb \leq 0.0429 \quad (1)$$

wherein, in the relationship (1), Ni and Sb represent each content in the solder alloy (mass %).

9. The solder alloy according to claim 1, wherein the alloy composition satisfies the following relationship (1), $$0.0600 \leq Ni/Sb \leq 0.0714 \quad (1)$$

wherein, in the relationship (1), Ni and Sb represent each content in the solder alloy (mass %).

10. The solder alloy according to claim 3, wherein the alloy composition contains 0.003 to 0.05 mass % of P.

11. The solder alloy according to claim 3, wherein the alloy composition contains 0.005 to 0.1 mass % of Ga.

12. The solder alloy according to claim 3, wherein the alloy composition contains 0.005 to 0.01 mass % of Ga.

13. The solder alloy according to claim 3, wherein the alloy composition further contains 0.005 to 0.01 mass % of Ge.

14. The solder alloy according to claim 1, wherein the solder alloy does not simultaneously contain both Al and Ag.

* * * * *